Patented Nov. 13, 1928.

1,691,726

UNITED STATES PATENT OFFICE.

CHARLES LICHTENSTADT, OF CHICAGO, ILLINOIS.

ART OF PROTECTING AND FIREPROOFING MATERIALS.

No Drawing.   Application filed February 10, 1928.   Serial No. 253,525.

My invention relates to the treatment of materials for the purpose of preserving and strengthening them and rendering them non-inflammable, and includes the process and also the compound used in the treatment of the materials for those purposes.

The object of my invention is to preserve and render non-inflammable and practically non-combustible a variety of fibrous animal or vegetable materials capable of absorbing moisture, such as textiles, pulp paper, wood, &c., without injuriously affecting such materials, as by changing their color or appearance or impairing their qualities, and at the same time to benefit or improve such materials by preserving them against decay, vermin, insects, &c., and increasing their structural strength and body firmness.

I accomplish my object by treating the materials with a composition produced by combining in an aqueous solution zinc chloride, mono-ammonium phosphate and ammonium chloride in the proportions substantially of three per cent zinc chloride, six per cent mono-ammonium phosphate, and six per cent ammonium chloride. The product resulting from the ensuing chemical reaction consists of a mixture of zinc ammonium phosphate, ammonium chloride, hydrochloric acid and mono-ammonium phosphate. The proportions given provide an excess of mono-ammonium phosphate so that in the reaction a part of it is carried over unchanged, the ammonium chloride also being carried over unchanged, its purpose being to increase the solubility of the zinc ammonium phosphate. The hydrochloric acid formed in the reaction is insufficient in quantity to have any objectionable effect on the textiles or other materials treated, and its presence is not essential.

This composition may be applied to the materials to be treated in a variety of ways, depending upon the character of such materials. For textiles simply spraying or immersing them and then wringing and drying them in air or by heat is sufficient to make them fire resistant or non-inflammable. This treatment causes no appreciable change in the shades or colors of textiles, and adds body firmness without impairing the quality of the fabric. It also acts as a preservative against decay, vermin, insects, &c.

In the treatment of denser materials, such as wood, the material is impregnated by soaking it for a variable length of time, depending upon the kind of wood treated, which may be accompanied by pressure to insure more thorough impregnation, followed by drying in the air or by heat as in a kiln. Wood so treated is not changed in appearance and can be painted, varnished or polished, and can be used for any purpose that untreated wood is used. Such treatment renders the wood substantially fireproof and is also preservative as in the case of textiles. If the wood be thoroughly impregnated leaching has very little effect on its fire resisting quality. The zinc ammonium phosphate has valuable preservative qualities and the mono-ammonium phosphate and ammonium chloride, particularly when combined separately or together with the zinc ammonium phosphate, make the materials non-inflammable and practically non-combustible. While the proportions given are those which I prefer to use as they give the best results, it should be understood that my invention is not limited to those exact proportions, but includes such variations therefrom as would not interfere with the efficacy of the composition for the purposes stated.

What I claim as my invention and desire to secure by Letters Patent, is—

1. The process of treating materials for the purpose stated which consists in impregnating them with a solution containing zinc ammonium phosphate, mono-ammonium phosphate, and ammonium chloride.

2. The process of treating materials for the purpose stated which consists in impregnating them with a solution containing zinc ammonium phosphate and ammonium chloride.

3. A composition for the purpose stated comprising the reaction products of approximately three per cent zinc chloride, six per cent ammonium phosphate and six per cent ammonium chloride.

4. A composition for the purpose stated comprising zinc ammonium phosphate, mono-ammonium phosphate and ammonium chloride.

5. A composition for the purpose stated comprising zinc ammonium phosphate and ammonium chloride.

CHARLES LICHTENSTADT.